United States Patent [19]
Fischer

[11] Patent Number: 5,923,274
[45] Date of Patent: Jul. 13, 1999

[54] PROCESS FOR TRANSMITTING DATA CODED WITH ADJUSTABLE ERROR-CORRECTION CODES

[75] Inventor: Ralf Fischer, Diekholzen, Germany

[73] Assignee: Robert Bosch GmbH, Stuttgart, Germany

[21] Appl. No.: 08/839,245

[22] Filed: Apr. 15, 1997

[30] Foreign Application Priority Data

Apr. 15, 1996 [DE] Germany .................. 196 14 701

[51] Int. Cl.$^6$ ............................................. H03M 13/00
[52] U.S. Cl. ............................................................ 341/94
[58] Field of Search ................................................ 341/94

[56] References Cited

U.S. PATENT DOCUMENTS 4,654,853  3/1987  Moriyama et al. .................. 371/41
4,701,923  10/1987  Fukasawa et al. .................. 371/41
5,703,887  12/1997  Heegard et al. ..................... 371/42

FOREIGN PATENT DOCUMENTS

95/24770  9/1995  WIPO .

*Primary Examiner*—Howard L. Williams
*Attorney, Agent, or Firm*—Kenyon & Kenyon

[57] ABSTRACT

A process for transmitting coded data over a data channel subject to interference. The information fields are provided with error protection in the amount required by the extent of interference. A configuration field, with information on the extent of data protection, is transmitted with the data.

9 Claims, 3 Drawing Sheets

PROCESS FOR TRANSMITTING DATA CODED WITH ADJUSTABLE ERROR-CORRECTION CODES

BACKGROUND INFORMATION

A method for transmitting coded data, intended for wirebound low-speed transmission of video images, has been proposed as a video coding standard by the International Telecommunication Union. The title of this standard is "Draft ITU-T Recommendation H.263" and it was issued by Study Group 15, Working Party 15/1, Dec. 5, 1995. This document contains the basic information for source coding of video signals, syntax and semantics for data transmission, as well as for data decoding in the receiver.

It has been shown, however, that the standard is not unconditionally suitable for transmitting video images over mobile telephone networks subject to errors, since the quality of the transmitted video images is insufficient due to the transmission errors that occur.

To solve this problem, it is an object of the present invention to make various modifications to the known H.263 standard. In the following description, concepts known from the H.263 standard will be used, as described, for example, in the above-mentioned document.

The textbook *Fehlerkorrigierende Blockkodierung für die Datenübertragung* (Error-correcting Block Coding for Data Transmission) by F. J. Furrer, 1981, Birkhäuser Verlag, Basel, describes a plurality of error-correcting and error-detecting coding processes. This textbook also describes the method of beginning each packet in a packet transmission with a synchronization word.

SUMMARY OF THE INVENTION

The process according to the present invention has the advantage over the related art that it allows data to be transmitted even through data channels subject to strong interference. The resources dedicated to error correction can be adjusted to the extent of the data channel interference. Thus, even when the extent of data channel interference varies, the optimum amount of data can always be transmitted.

The extent of redundancy required for error protection can be defined by transmitting a configuration field. Since the configuration field contains important information for the subsequent data processing, it is provided with an especially powerful error protection. When the data is transmitted in packets, a particularly reliable packet start recognition is ensured through the use of a Barker word or a Williard word. The extent of error protection can be adjusted to the quality of the transmission channel as perceived by the receiver of data through feedback concerning data channel quality. The process according to the present invention is particularly well suited for transmission of image data, where important information can be particularly well protected. The information that is particularly important for imaging can thus be particularly reliably protected, so that at least a reduced quality image can be obtained even in the case of strong interference. This information can be further secured, for example, through a check sum for error recognition.

DETAILED DESCRIPTION

The process according to the present invention is to be used for transmitting data, in particular image data, over data channels subject to interference. Data channel refers here in particular to a mobile radio channel. In such channels, the transmission speed is highly restrained. At such transmission speeds, the image resolution may not be as good as, for example, in the case of conventional TV images.

Figure 1A:
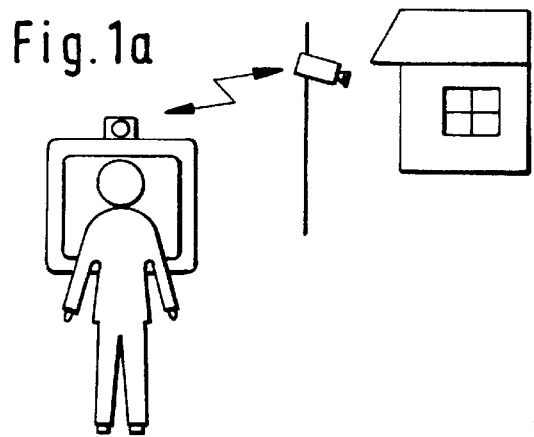
FIG. 1a shows a first field of application for the process according to the present invention.
Figure 1B:
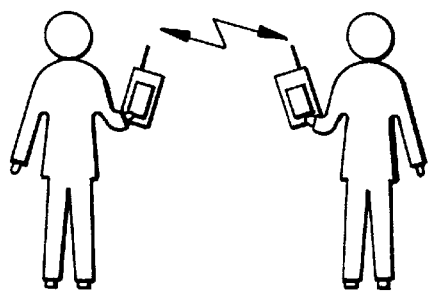
FIG. 1b shows a second field of application for the process according to the present invention.
Figure 1C:
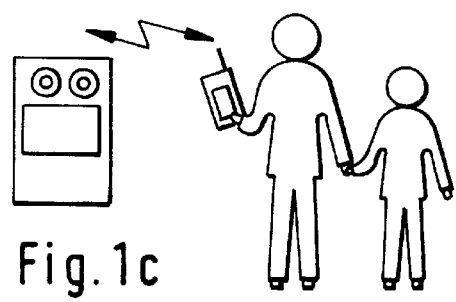
FIG. 1c shows a third field of application for the process according to the present invention.
Figure 1D:
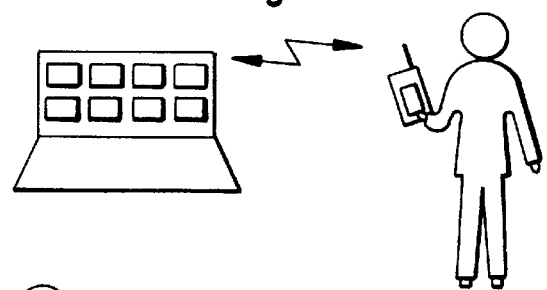
FIG. 1d shows a fourth field of application for the process according to the present invention.
Figure 1E:
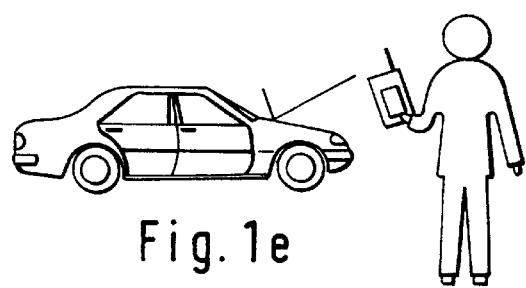
FIG. 1e shows a fifth field of application for the process according to the present invention.

FIGS. 1a–1e show some applications of such data transmissions. FIG. 1a shows, for example, a video monitoring system used to provide security in buildings exposed to risk. FIG. 1b shows the transmission of image data between two mobile video phones as an application. FIG. 1c shows the application for checking individuals with the help of a mobile video phone. FIG. 1d shows the application of message transmission to a mobile video phone. FIG. 1e shows the use of a video phone in an automobile workshop for repair purposes. In this case, repair instructions can be transmitted from a central station to a mobile receiver. The process in these cases is implemented in the terminals (video phone, video image receiver, video image camera, etc.).

Figure 2:
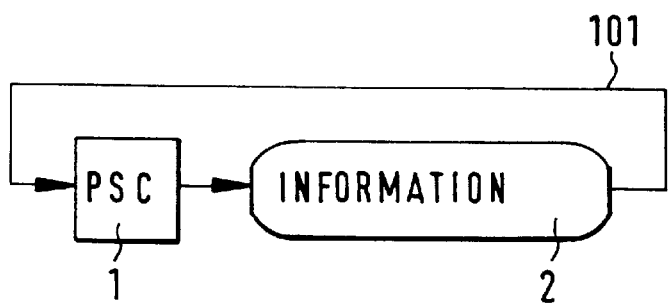
FIG. 2 shows the known structure of a message according to standard H.263.

FIG. 2 shows the transmission of coded data in a generic form. Data is transmitted through a serial data channel, i.e., through a medium suitable for signal transmission. As explained in conjunction with FIG. 1, what is meant here is mainly transmission of image data. At the beginning of the serial data transmission, a first code word 1 is transmitted, which indicates that data transmission follows. This code word allows the receiver to be synchronized, i.e., the receiver can establish, on the basis of the code word received, where the message starts and thus to interpret the subsequent coded data stream consisting, in general, of individual zero and one bit states. In the present case, this code word 1 includes the PSC (Picture Start Code) as defined in standard H.263. After this PSC, an information field 2 follows, which may have any length and contains the data required for constructing the image. According to H.263, the individual pictures are transmitted in individual data packets, each having its own PSC at the beginning.

FIG. 2 shows the detail of this data packet. Arrow 101 pointing from the end of information field 2 back to the beginning of PSC 1 indicates that this data is often repeated to transmit consecutive video images. H.263 assigns PSC a fixed length. The following figures also show data fields with conventionally fixed data lengths as boxes with rounded edges. The process according to standard H.263, illustrated in FIG. 2, assumes that the data is transmitted with a high degree of reliability. For example, if the Picture Start Code is not transmitted correctly due to interference, the receiver can no longer interpret the subsequent information field 2 containing image data. Therefore, measures must be taken that allow the coded data to be interpreted even in the case of a transmission channel subject to strong interference, such as, for example, a mobile radio. Error-correcting coding procedures are known for such channels affected by interference. The principle of such error-correcting coding procedures consists of providing a certain amount of coding redundancy, so that it can be determined which bits were transmitted erroneously. Of course, such redundancy requires more data to be transmitted. The better the error correction of the code used, the greater the amount of data needed. Since, however, the amount of data that can be transmitted per unit of time is limited, a compromise must be found between the performance of the error-correcting code and the transmission capacity of the data channel.

Figure 3:
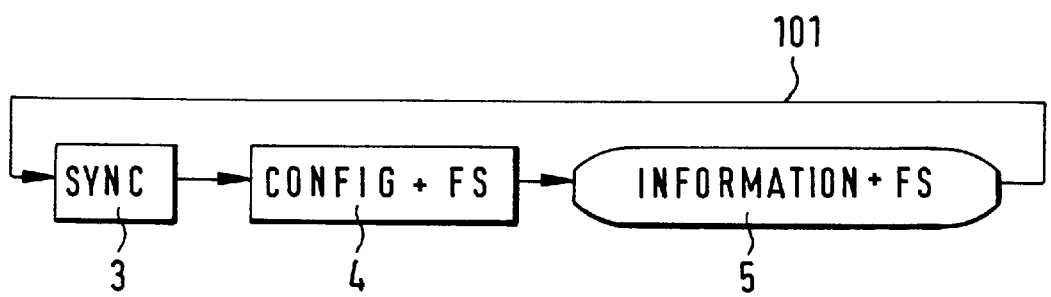
FIG. 3 shows a first structure of a message according to the present invention.

FIG. 3 shows how coding is performed according to the process of the present invention to obtain proper error protection, i.e., the use of an error-correcting code, while preserving the transmission rate of the data channel. The coded data shown in FIG. 3 have a synchronization field 3, a configuration field 4, and an information field 5. In contrast to FIG. 2, information field 5 has an error protection (FS). This error protection reduces the useful information in information field 5. If, for example, information field 2 has a length of 100 bits without error protection in FIG. 2 (i.e., 100 bits of useful information), information field 5 of the same length in FIG. 3 can only transmit less information, e.g., 80 bits. Thus 20 bits were used to ensure that transmission errors are corrected. According to the intensity of the interference in the transmission channels, it can be desirable to provide more or less error protection, i.e., the proportion of useful information in information field 5 can be higher or lower accordingly.

The known procedures for forward error correction can be used for coding, such as for example the BCH code, the Reed-Solomon code, the RCPC code, or other error-correcting coding procedures. A non-comprehensive overview of error-correcting coding procedures is provided, for example, in the textbook by Furrer, referred to above.

Depending on the extent of interference in the transmission channels, a more or less powerful error protection is used for information field 5. To allow the receiver to decode information field 5, the receiver must be told what procedure was used to encode the data in information field 5 and to what extent error protection was used. This information is made available to the receiver through configuration field 4. Configuration field 4 thus contains information regarding the error-correction code of information field 5; for example, configuration field 4 contains information on the coding procedure used and the number of additional bits used for error protection.

Therefore, the configuration field contains control data allowing the useful data contained in the information field to be decoded. Since a transmission error in configuration field 4 would prevent the subsequent information from being interpreted, the configuration field 4 (CONFIG) itself is provided with a particularly powerful error protection (FS). For example, if the transmitter and the receiver of the data have agreed on a coding procedure, 4 bits are sufficient to produce 16 different levels of error protection. To properly secure these 4 bits, another 10 bits can be used, for example, to ensure that the configuration field is provided with a particularly powerful error protection.

Instead of the Picture Start Code 1 known from FIG. 2, a synchronization field 3 (SYNC) is used in FIG. 3. This synchronization field 3 differs from the Picture Start Code of FIG. 2 by being a particularly reliably transmitted synchronization signal, which can be recognized with a high degree of reliability even if individual bits have been transmitted erroneously. Such synchronization signals are known as Barker words or Williard words and are described, for example, in Furrer's book. The synchronization field 3 shown in FIG. 3 can thus be recognized in a highly reliable manner. The synchronization field also contains control data that allow the useful information contained in the information field to be decoded.

The process according to the present invention provides for varying amounts of resources to be used to secure information field 5, depending on the interference in the transmission channel. Since the transmission capacity of the transmission channel is limited, increased safety, i.e., a greater amount of resources used for error protection, means that less information (useful signal) can be transmitted. When transmitting image data, this means, for example, that in the case of a high degree of interference with the transmission signal, only data for creating a less sharp picture or a picture with less bright colors can be transmitted. On the other hand, when there is no interference in the transmission channel, pictures with a high degree of sharpness and color brightness can be transmitted.

Therefore, the process according to the present invention provides for variable error protection, adjusted according to the interference in the transmission channel. The amount of error protection can be changed from one picture to another when transmitting video images. To adjust the amount of error protection as a function of the interference in the transmission channel, the transmitter of the coded data needs information regarding the extent of interference in the transmission channel. This information can be provided to the transmitter of the coded data, for example, by the receiver of the coded data, who can determine, on the basis of the coded data received by the receiver, how many errors have occurred, i.e., how much interference is present in the transmission channel.

Figure 4:
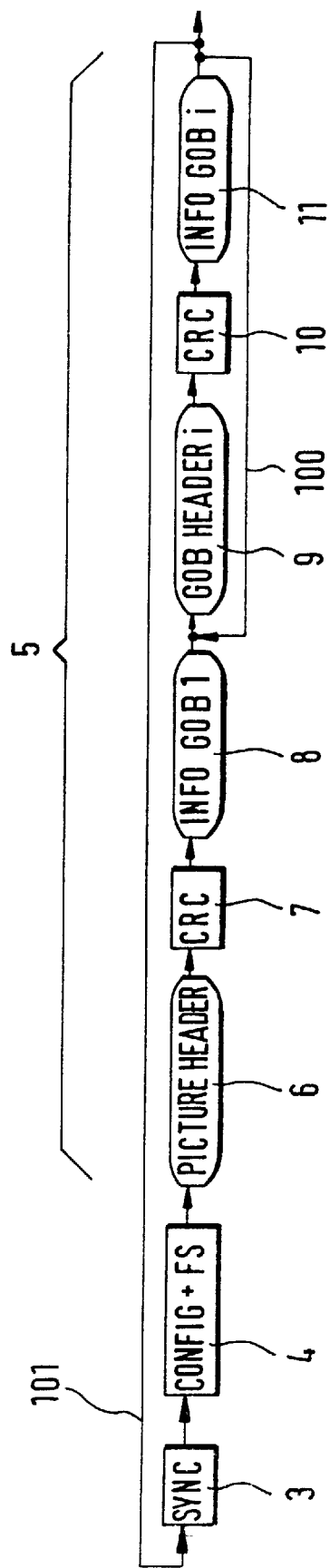
FIG. 4 shows a second structure of a message according to the present invention.

Information field 5 contains data of different degrees of importance. When transmitting images, these are part of the information field containing information for a plurality of pixels. According to the present invention, these portions of information field 5 are provided with a particularly strong protection. FIG. 4 shows such protection through the bit stream of coded data for a picture. Synchronization field 3 and configuration field 4 correspond to the similar fields known from FIG. 3. The information field 5 is, however, divided into a plurality of information subfields 6 through 11, which have different functions.

The process according to the present invention is now described with reference to an image transmission according to the standard H.263. In principle, however, the process according to the present invention can also be used for other types of data transmission.

The information for the transmitted image is combined in blocks and then in groups of blocks (GOB). Each block contains a plurality of pixels. In FIG. 4, this block group information is represented, for example, in information subfields 8 and 11. Headers 6, 9 containing information that is valid for all pixels of the block groups are provided in front of the individual image information strings. These headers are illustrated in FIG. 4 as information subfields 6 and 9. In these headers 6, 9, it is established, for example, with what sharpness or color brightness the picture is transmitted. The first header 6 of a picture has a special function, since certain types of information it contains apply to all the subsequent information relating to that picture. In FIG. 4, this header of the first block groups is denoted as Picture Header 6, since it contains data that applies to the entire picture. Since any interference in this Picture Header 6 affects the entire picture, this Picture Header is transmitted with a particularly high degree of data security, i.e., particularly great amounts of resources are used for error correction.

In addition to the error correction provided for the Picture Header, a check field 7 is transmitted after Picture Header 6; this check field 7 can be configured as a CRC field, for example. This check field makes it possible to determine, using relatively little resources, whether the data of the Picture Header have been transmitted correctly, i.e., whether or not the correct data have been obtained after decoding and error correction. Check field 7 is configured as an error-detecting, but not error-correcting, code. The advantage of such an error-detecting coding procedure is that a relatively small amount of resources is used to confirm the absence of errors in the previously transmitted data. After check field 7, the actual data for the first block group are then transmitted with field 8. After transmitting the information for the first block group 8 (INFO GOB 1), header 9 (GOB Header I), check fields 10 and data 11 (INFO GOB I) for the other block groups are transmitted.

As indicated by iteration arrow 100, this procedure is repeated until the information of all groups has been transmitted. Iteration arrow 101 indicates that this procedure is repeated for each picture. The header 9 of each block group is then protected by a check field 10.

The data organization for transmitting the images complies with the H.263 standard. Picture Header 9 can, for example, include the H.263 symbols TR, PTYPE, PQUANT, CPM, PSBI, TRB, DBQUANT, PEI, PSPARE. GOB headers 9 for the block groups include, for example, H.263 symbols GN, GSBI, GFID, GQUANT. Since both Picture Header 6 and GOB header 9 have variable lengths, it is also possible to insert check fields 7, 10 with a fixed length that is greater than the maximum header length as a CRC check sum. This results in a structure that is simpler and less subject to interference. Furthermore, configuration field 4 may contain information on whether or not these additional error-detecting fields are being used.

What is claimed is:

1. A process for transmitting coded data through a data channel, comprising the steps of:

coding useful data with a first error-correcting code;

transmitting the coded useful data through the data channel to a receiver; and transmitting control data through the data channel to the receiver, the control data containing information used by the receiver for decoding the coded useful data, wherein the information includes a configuration field coded with a second error-correcting code that is different than the first error-correcting code.

2. The process according to claim 1, further comprising the step of limiting an amount of the useful and control data transmitted per unit of time over the data channel, and wherein the configuration field indicates a degree of redundancy in the first error-correcting code.

3. The process according to claim 2, wherein the configuration field has a fixed length.

4. The process according to claim 1, wherein:

the useful data is transmitted in packets;

a synchronization field is transmitted at a beginning of each block of data; and the synchronization field is configured as one of a Barker word and a Williard word.

5. The process according to claim 1, wherein the useful and control data are transmitted from a transmitter to the receiver, and wherein the transmitter selects the first error-correcting code for the useful data as a function of a quality of the data channel.

6. The process according to claim 1, wherein the useful data is configured as image data for a plurality of pixels, and wherein the data channel is configured as a mobile radio data channel.

7. The process according to claim 6, further comprising the steps of:

transmitting an error-detecting check sum for the useful data used for the plurality of pixels; and determining whether errors have been corrected using the error-detecting check sum after error correction using the first error-correcting code.

8. The process according to claim 1, wherein the useful data includes image data for a plurality of pixels, and further comprising the step of transmitting an error-detecting check sum for data fields that contain information on the plurality of pixels.

9. The process according to claim 1, wherein the second error-correcting code provides a level of data security that is higher than a level of data security provided by the first error-correcting code.

* * * * *